US009609523B2

(12) United States Patent
Takekawa et al.

(10) Patent No.: US 9,609,523 B2
(45) Date of Patent: Mar. 28, 2017

(54) RELAYING OPERATION BETWEEN BASE STATIONS USING WHITE SPACES IN WIRELESS ACCESS SYSTEM

(71) Applicant: Hitachi Kokusai Electric Inc., Chiyoda-ku, Tokyo (JP)

(72) Inventors: Masayuki Takekawa, Tokyo (JP); Keigo Hasegawa, Tokyo (JP); Kei Yanagisawa, Tokyo (JP); Keat Beng Toh, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 0 days.

(21) Appl. No.: 15/021,395

(22) PCT Filed: Sep. 10, 2014

(86) PCT No.: PCT/JP2014/073923
§ 371 (c)(1),
(2) Date: Mar. 11, 2016

(87) PCT Pub. No.: WO2015/060033
PCT Pub. Date: Apr. 30, 2015

(65) Prior Publication Data
US 2016/0227418 A1 Aug. 4, 2016

(30) Foreign Application Priority Data
Oct. 22, 2013 (JP) ................................ 2013-219078

(51) Int. Cl.
*H04W 16/14* (2009.01)
*H04W 72/08* (2009.01)
*H04W 48/16* (2009.01)

(52) U.S. Cl.
CPC ........... *H04W 16/14* (2013.01); *H04W 48/16* (2013.01); *H04W 72/082* (2013.01)

(58) Field of Classification Search
CPC ..... H04W 16/14; H04W 48/16; H04W 72/04; H04W 72/082
(Continued)

(56) References Cited

U.S. PATENT DOCUMENTS

2011/0019104 A1* 1/2011 Kwak .................. H04W 16/14
348/731

FOREIGN PATENT DOCUMENTS

| JP | 2012-039613 A | 2/2012 |
| JP | 2013-187604 A | 9/2013 |
| WO | 2011/116240 A1 | 9/2011 |

OTHER PUBLICATIONS

International Search Report from International Application No. PCT/JP2014/073923 mailed Dec. 16, 2014.

* cited by examiner

*Primary Examiner* — Philip Sobutka
(74) *Attorney, Agent, or Firm* — Brundidge & Stanger, P.C.

(57) ABSTRACT

Disclosed is a wireless communication system using white spaces and a base station that does not have its own backhaul, starts wireless communications without radiating radio waves of frequencies causing interference with primary users. A BS being in isolation starts a wireless communication with a CPE, connected to the internet, so as to access a database to acquire a list of frequencies available for transmission. The BS uses a predetermined frequency to perform the wireless communication with the CPE, and acquires, via this wireless communication, the list of frequencies available for transmission. Thereafter, the BS performs wireless communications with the CPE and with another CPE on the basis of the acquired list of frequencies available for transmission. The BS can hold, in advance, information of the predetermined frequency for which it has
(Continued)

been estimated that the BS will cause no interference with the wireless communications of the primary users.

2 Claims, 10 Drawing Sheets

Pattern of the frequency utilization under the situation that BS20 is isolated P: Preamble, Frame header BS10 can recognize that frequency f1 is available based on the information gotten from the database on the Internet.
BS20 performs the radio communication with CPE by using frequency f10, because BS20 does not know whether frequency f2 is available or not.

FIG. 5

Pattern 1 of the frequency utilization just after the situation that BS20 was connected to CPE21

P: Preamble, Frame header

CPE21 is connected to CPE11 via interface section 205, furthermore, CPE21 is connected to the Internet through the radio communication between CPE11 and BS10.

BS20 is connected to Internet 40 by having been connected to CPE21. Then, BS20 can get the list of frequencies available for transmissions based on its location information by accessing database 50 or coexistence manager 60.

P: Preamble, Frame header

Between CPE1 and BS2, located closely each other, the following interference occurs.
The downlink signal transmitted from BS2, using frequency f2, may jump into CPE1 with the high electricity, then it becomes interference.
The uplink signal transmitted from CPE1, using frequency f1, may jump into BS2 with the high electricity, then it becomes interference.

P: Preamble, Frame header

Since transmit/receive timing between CPE1 and CPE2, located closely each other, is matching, CPE1 and CPE2 are not interfered with each other.

RELAYING OPERATION BETWEEN BASE STATIONS USING WHITE SPACES IN WIRELESS ACCESS SYSTEM

TECHNICAL FIELD

This invention relates to a wireless communication system using white space. In particular, this invention relates to a method for allocation of frequencies used in radio communication equipment.

BACKGROUND ART

The recent progress of the information-oriented society is really remarkable. As a communication method for information communication equipment or information communication service, wireless communication is often used for other than cable communication. With this situation, the demand for the limited resource of radio frequencies is increasing. Therefore, lack of a frequency which can be assigned to the communication is becoming a big problem in some countries. Generally, the frequencies are managed by the country under the license. Only the authorized licensees can use the frequencies in limited places and times, with severe managements. The demand for the frequencies will continue increasing in future. Therefore, corresponding to the demand for the frequencies, the new method of the use of the frequency, not to be seized with past method of the use of the frequency, is needed.

Recently, in order to resolve the problem of lack of frequency, a new method of the utilization of the frequency is being studied. The method may use a frequency band, which has been already assigned to the licensee, but the frequency band is not used in certain spatial and temporal conditions. Such a frequency band may be called a white space. For example, regarding the cognitive wireless communication system, the research and development, or the standardization for this system is currently being enforced. In the cognitive wireless communication system, under the condition that avoiding the influence on the use of the specific frequency for the existing system which is operated by licensed user, the user who has not been licensed to use the frequency can use the frequency flexibly, as a white space. Hereinafter, the user who has an authorized license to use the specific frequency is referred to as a primary user, and the user who has not been licensed to use the specific frequency corresponding to the white space is referred to as a secondary user. For example, those are referred to Non-Patent Literature 1.

As an example, in Wireless Regional Area Network (WRAN) system, using white spaces, being standardizing in IEEE802.22, by accessing a white space database or a coexistence manager on the IP network (hereinafter, database etc.), each radio station can get a list of frequencies available for transmission and allowable maximum transmission electricities, based on its location information. The list of frequencies available for transmission includes the frequency information that can perform wireless communication without giving a primary user interference. The list of frequencies available for transmission is managed collectively while updating the list at any time, by Spectrum Manager (SM) in Base Station (BS), which is connected to Customer Premises Equipment (CPE). In this way, BS can decide an operative frequency based on the list of frequencies available for transmission.

In another case, each radio station (BS or CPE, the same applies hereinafter) may include a spectrum sensing functionality. When each radio station detects the condition that the frequency which is decided by the spectrum sensing functionality, has already been used by a primary user, each radio station notifies Spectrum Manager (SM) of this information. Then, SM can exclude this frequency from the list of frequencies available for transmission. By performing a dynamic spectrum access based on the information changing moment by moment in this way, the wireless communication system using a white space can realize the communication for a secondary user while avoiding influence on use of the frequency for a primary user.

As for the wireless communication system using a white space, various kinds of techniques have been suggested so far. For example, patent literature 1 discloses a wireless communication method using a first base station and a second base station. The first base station can provide first backhaul information to the second base station, by using a shared channel. The shared channel can be supported by a white space channel, Authorized Shared Multi-user (ASM) channel, or Industry Science Medical (ISM) channel. Furthermore, the first base station can provide second backhaul information to the second base station, by using a legacy backhaul channel.

For example, patent literature 2 disclose a wireless communication method, the wireless communication method is comprised of receiving a first signal under using a first channel, deciding a second channel based on the first signal, receiving a second signal under using the second channel, and communicating with a wireless device under using the second channel based on the communication quality of the second signal.

PRIOR ART DOCUMENTS

Patent Literature

Patent Literature 1, Japanese Patent Application Laid-Open Publication No. 2013-523024
Patent Literature 2, Japanese Patent Application Laid-Open Publication No. 2013-529047

Non Patent Literature

Non Patent Literature 1, Cognitive Wireless RAN Medium Access Control (MAC) and Physical Layer (PHY) Specifications: Policies and Procedures for Operation in the TV Bands, IEEE Std 802.22-2011, 1 Jul. 2011, Part 22

SUMMARY OF INVENTION

Technical Problem

Figure 7:
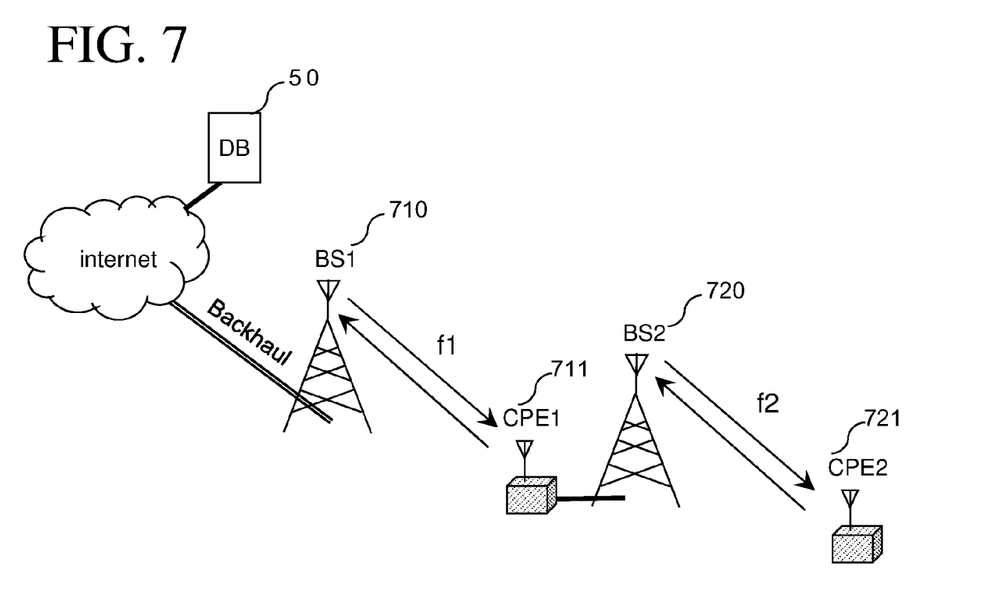
FIG. 7 Figure depicting the example of system configuration for the relay communication system using IEEE802.22 wireless link.

As described above, the system, being standardizing in IEEE802.22, may be the system performing a secondary use while avoiding the interference in the primary user, by referring to the list of frequencies available for transmission retrieved from a database etc. or by using spectrum sensing functionality in each base station. Here, as illustrated in FIG. 7, is a relay communication system using radio communication link prescribed in IEEE 802.22. The relay communication system illustrated in FIG. 7 includes a first base station (BS1) 710 which is connected to the Internet through a backhaul line, a first terminal station (CPE1) 711 communicating with BS1 by radio under using frequency f1, a second base station (BS2) 720 which is connected to CPE1 711 by cables, and a second terminal station (CPE2) 721 communicating with BS2 720 by radio under using frequency f2. BS2 720 and CPE1 711 in FIG. 7 can function as a relay station.

Figure 8:
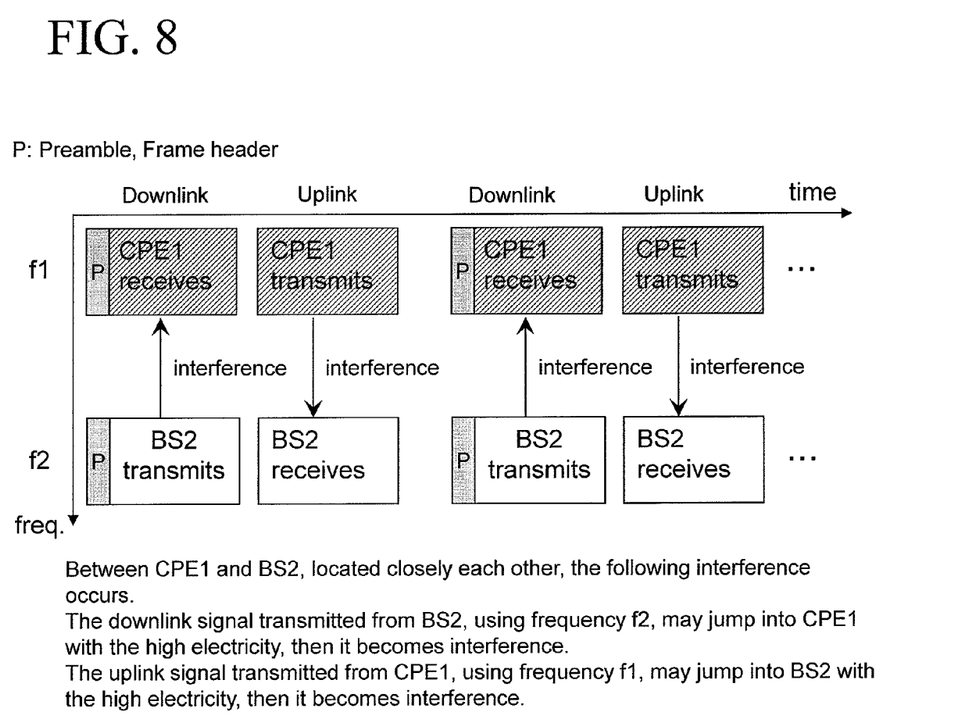
FIG. 8 Figure depicting the example of transmitting/receiving timing between CPE2 and BS2, which configure the relay station in the relay communication system illustrated in FIG. 7.

The system described in IEEE802.22 is a Time Division Duplex (TDD) system. Then, to reduce interference, it is essential that each BS in the system synchronizes the transmit/receive timing of Superframe or frame, by using a clock function of Global Positioning System (GPS), etc., respectively. Therefore, in the configuration for relay communication as illustrated in FIG. 7, transmit/receive timing between BS2 720 and CPE1 711, located closely each other as a relay station, becomes the relations as illustrated in FIG. 8. For example, in the timing to transmit a downlink signal (a signal from a higher device to a lower device), CPE1 711 can receive a downlink signal from BS1 710 under using frequency f1, and BS2 720 can transmit a downlink signal under using frequency f2. As a result, the downlink signal transmitted from BS2 720, under using frequency f2, may jump into CPE1 711 with the high electricity and becomes interference. In addition, in the timing to transmit an uplink signal (a signal from a lower device to a higher device), CPE1 711 can transmit an uplink signal to BS1 710 under using frequency f1, and BS2 720 can receive an uplink signal under using frequency f2. As a result, the downlink signal transmitted from CPE1 711, under using frequency f2, may jump into BS2 720 with the high electricity and becomes interference.

Therefore, the relay station, which is configured by the two radio stations as base station (BS2) 720 and the terminal station (CPE1) 711, has problems that an outbreak of the blocking caused by the situation that the electric wave which is radiated from one radio station is received by the other radio station as a high level, a deterioration of signal-to-noise ratio (SNR) caused by the situation that a leakage ingredient out of the band, included in the electric wave which is radiated from one radio station, is received by the other radio station as a high level, and any other interference on the receiving operation of each radio station, configuring the relay station.

Figure 9:
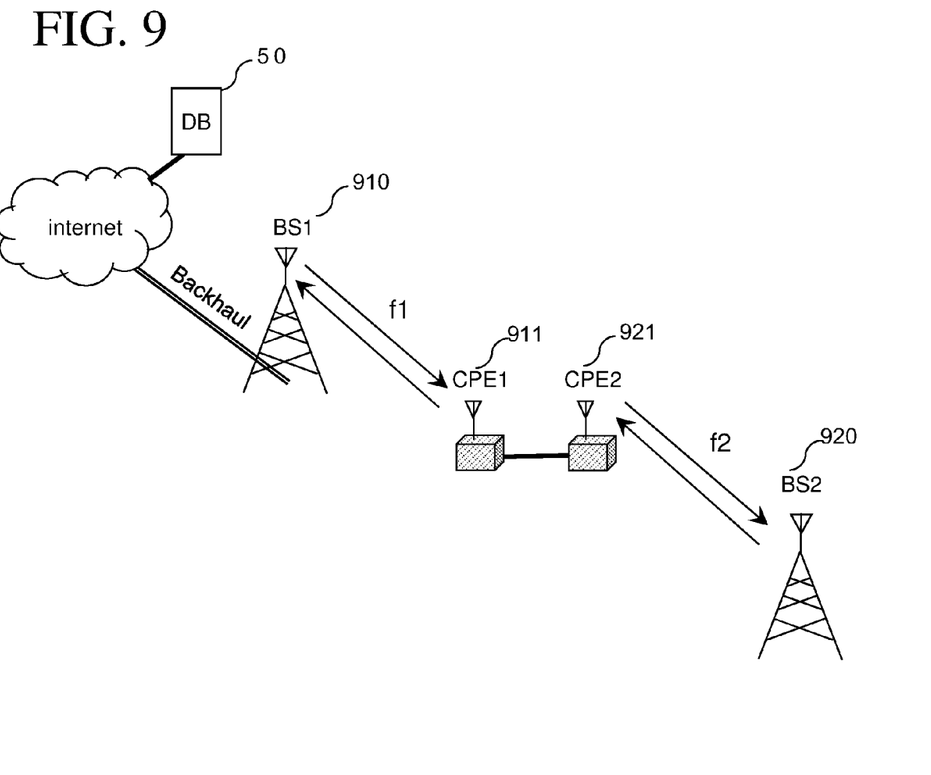
FIG. 9 Figure depicting the example of system configuration for the relay communication system using IEEE802.22 wireless link.

To resolve these problems, the configuration for relay is illustrated in FIG. 9. The relay communicating system illustrated in FIG. 9 includes a first base station (BS1) 910 which is connected to the Internet through a backhaul line, a first terminal station (CPE1) 911 communicating with BS1 910 by radio under using frequency f1, a second terminal station (CPE2) 921 communicatively connected with CPE1 911 by cables, and a second base station (BS2) 920 which is communicatively connected to CPE2 921 by radio under using frequency f2. CPE1 911 and CPE2 921 in FIG. 9 can be cooperating as a relay station.

Figure 10:
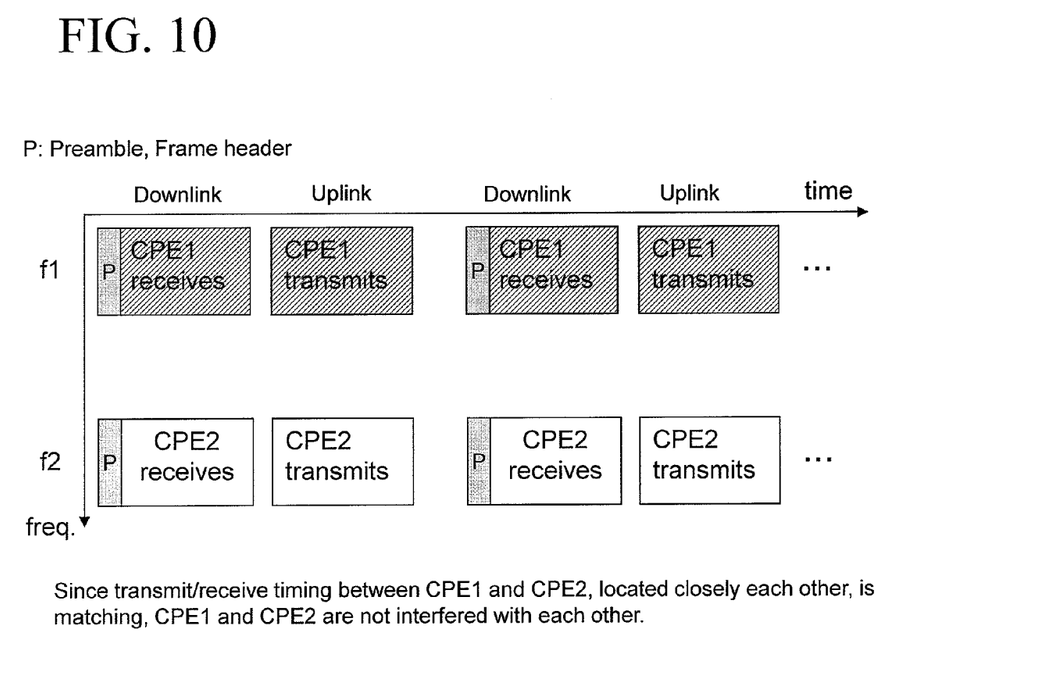
FIG. 10 Figure depicting the example of transmitting/receiving timing between CPE1 and CPE2, which configure the relay station in the relay communication system illustrated in FIG. 9.

In the configuration for relay communication as illustrated in FIG. 9, transmit/receive timing between CPE1 911 and CPE2 921, located closely to each other as a relay station, relations illustrated in FIG. 10. For example, in the timing to transmit a downlink signal, CPE1 911 can receive a downlink signal from BS1 910 under using frequency f1, and CPE2 921 can receive a downlink signal from BS2 920 under using frequency f2. In addition, in the timing to transmit an uplink signal, CPE1 911 can transmit an uplink signal to BS1 910 under using frequency f1, and CPE2 921 can transmit an uplink signal under using frequency f2.

In this configuration for relay communication, transmit/receive timing between CPE1 911 and CPE2 921, located closely to each other, is matching. Therefore, CPE1 911 and CPE2 921 are not interfering with each other. For example, by allocating the terminal stations (CPE1 911 and CPE2 921) for two radio stations which configure the relay station, respectively, transmit/receive timing becomes the timing as illustrated in FIG. 10. Then, the situation that the other radio station is transmitting a signal when one radio station is receiving a signal can be avoided. In addition, due to the method arranging the terminal stations as relay stations in the domain near the border of the communication area, the efficiency of the arrangement of radio stations can improve, because the domains near the borders of the two communication areas are overlapped.

BS2 920 in the configuration for relay communication illustrated in FIG. 9, is isolated under the situation that BS2 920 cannot connect to the Internet because the BS2 920 cannot establish a radio link with CPE2 921. Hereinafter, such a base station (BS) will be called as an isolated base station (an isolated BS). In order to establish a second hop of radio communication, BS2 920 as an isolated BS tries to start a radio communication using a new white space. But, BS2 920 cannot get a list of frequencies available for transmission based on its location information, being provided by the database etc. on the Internet, because BS2 920 has not established a radio link with CPE2 921. For example, BS2 920 radiates electric waves without knowing the frequency which is available to transmit at its location. When BS2 920 does not have a spectrum sensing functionality, a risk for giving a primary user interference may be increased.

In view of the problem mentioned above, an embodiment of the present invention provides the wireless communication system using a white space. The wireless communication system includes the isolated BS, can start a radio communication without radiating the electric waves which may interfere with a primary user, before the isolated BS gets the white space information (for example, the list of frequencies available for transmission) based on its location information, from the database etc.

Solution to Problem

To resolve the problem mentioned above, the composition of the wireless communication system regarding an embodiment of the present invention may be as follows. A wireless communication system to conduct communications between a base station and a terminal station uses a white space secondarily. The white space is the frequency that is not used by a primary user among the frequencies licensed to the primary user. The wireless communication system includes a managing apparatus for managing the information of white spaces and the base station, having information of a predetermined frequency, which is estimated so that the base station does not cause interference with the wireless communication of the primary users.

In order to acquire the information of the white space that is available in the base station, when the base station needs to access the managing apparatus through the wireless communication with a terminal station, being within the cell of the base station, the base station communicated with the terminal station using the predetermined frequency.

After retrieving the white space information which is available for the base station by accessing the managing apparatus through the radio communication, the base station performs a radio communication with a terminal station within the cell of the base station, by using the white space.

In addition, an embodiment of the present invention includes the following configuration.

The terminal station has information of a predetermined frequency, which is estimated so that the base station does not cause interference with the wireless communication of the primary users.

When the terminal station can access the managing apparatus, the terminal station can search a base station based on the predetermined frequency information. When the terminal station cannot access the managing apparatus, the terminal station searches the base station without making a limit for frequencies.

In addition, an embodiment of the present invention includes the following configuration.

In order to access the management apparatus, a first base station does not need to go through wireless communication with the terminal station within the cell of the first base station. In order to access the management apparatus, a second base station needs to go through wireless communication with the terminal station within the cell of the second base station. A relay station relays the communication between the first base station and the second base station. The relay station is configured to connect the first terminal station within the cell of the first base station and the second terminal station within the cell of the second base station by a wire line. In order to acquire the information of the white space that is available in the second base station from the managing apparatus, the second base station communicates with the terminal station in the distance that can communicate by using the predetermined frequency.

After getting the white space information which is available for the second base station by accessing the managing apparatus through the radio communication, the second base station performs a radio communication with a terminal station within the cell of the second base station by using the white space.

Advantageous Effects of the Embodiments

As stated above, according to this embodiment, the following wireless communication system using white spaces is disclosed. In the multi-hop wireless communication system including a base station which cannot get the information of the white space (for example, the list of frequencies available for transmission) except for via a terminal station, the base station can start communication without radiating any radio waves of frequencies having a possibility to cause interference with primary users, though the condition is before getting white space information.

DESCRIPTION OF EXEMPLARY EMBODIMENTS

An exemplary embodiment of the present invention will be described with reference to the drawings.

[Overview of the Embodiment]

As an exemplary embodiment of the present invention, a wireless communication system includes a base station and a terminal station. They are performing radio communications, respectively. The wireless communication system performs multi-hop wireless communication, using a white space. The outline of the configuration of the wireless communication system will be explained below. In the situation that the base station is isolated from the network, thereby there are no means to get a list of frequencies which are available for transmission, except for the wireless communication. The base station may include a radio communication means using a predetermined frequency. The predetermined frequency is estimated so as to get the list of frequencies which are available for transmission. The predetermined frequency is except for the frequency that the wireless communication system may use as a white space. Until the base station gets the list of frequencies which are available for transmission, the base station transmits or receives the information under the predetermined frequency. Therefore, unless the base station radiates the waves which frequency may not be permitted to radiate, the base station can use the frequency, included in the list of frequencies which are available for transmission, the list being based on the information of its own location.

[Outline of the Wireless Communication System]

Figure 1:
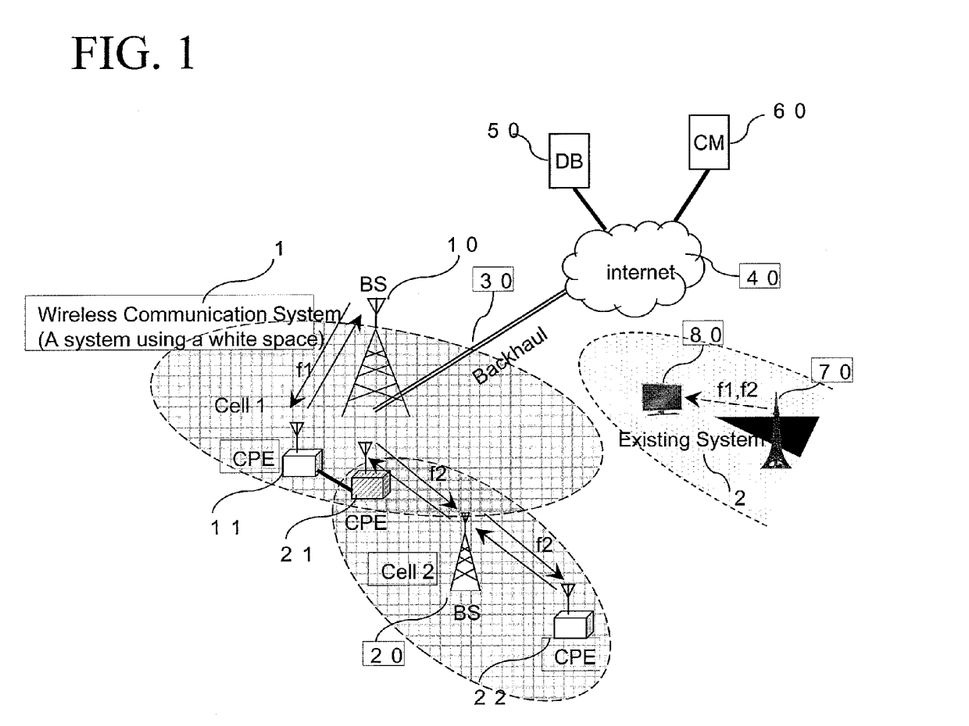
FIG. 1 Schematic configuration diagram of the wireless communication system according to the exemplary embodiment of the present invention.

FIG. 1 is a schematic configuration diagram of the wireless communication system according to the exemplary embodiment of the present invention. An exemplary embodiment of wireless communication system 1 performs multi-hop wireless communication, using a white space.

As depicted in FIG. 1, wireless communication system 1 may include CPE11, CPE21 and CPE22 as a terminal station, respectively. Wireless communication system 1 may include BS10 and BS20 as a base station, respectively, connected to the terminal stations. Wireless communication system 1 may include backhaul line 30 for BS10, Internet 40, white space database (DB) 50 (hereinafter, database 50), and white space coexistence manager (CM) 60 (hereinafter, coexistence manager 60). In this embodiment, database 50 and/or coexistence manager 60 may be corresponding to a managing apparatus. Unless otherwise mentioned, BS or CPE may include functions which are required in IEEE802.22.

BS10 may be connected to Internet 40 through backhaul line 30. Thereby, BS10 can access database 50 or coexistence manager 60, which exists on Internet 40. BS10 configures cell 1 including CPE11 which exist within the radio communication area of BS10. BS20 configures cell 2 including CPE21 and CPE22 which exist within the radio communication area of BS20. CPE11 and CPE21 may operate as a relay station by being connected each other using a cable.

BS20 and CPE22 may be connected to Internet 40 through the radio link between BS10 and CPE11 (a first hop of radio link), and the radio link between CPE21 and BS20 (a second hop of radio link). According to this configuration for the relay, CPE22 being in the location where the radio wave from BS10 cannot be reached, may be provided the Internet service via BS20.

A communication system being operated by the primary user who is licensed to frequency utilization (hereinafter, existing system 2) may include transmitting station 70 and receiving station 80. Existing system 2 may be using frequency f1 and f2, under licenses, respectively. In the following explanation, a secondary user who does not have licenses regarding frequency f1 and f2, shall use frequency f1 and f2 as a white space, respectively.

Here, as illustrated in FIG. 1, even existing system 2 is using frequency f1 and f2 for communication, on condition that a service area of wireless communication system 1 is far enough away from the service area of existing system 2, and transmission power of the radio station in wireless communication system 1 is lowered enough, wireless communication system 1 can communicate using frequency f1 or f2 without giving existing system 2 interference. In this embodiment, one of the roles of database 50 is to provide information of the frequency which is available to radio communication without affecting the primary use system in certain spatial and temporal conditions.

Furthermore, BS10 and BS20, constituting wireless communication system 1, can perform wireless communication using a different frequency as a secondary use, respectively. For example, BS10 may use frequency f1, and BS20 may use frequency f2, respectively. In this embodiment, in the situation that the plurality of wireless communication systems exist, and each of the wireless communication system uses a frequency as a secondary use, the role of coexistence manager 60 is to restructure the list of frequencies available for transmission so as to communicate appropriately under the situation avoiding the interference between the second use systems. In this way, the wireless communication system using white spaces can utilize the source of frequencies, which are available in spatial conditions, effectively.

Here, the frequency, which is used in BS10 as a secondary use, shall be provided by accessing database 50 or coexistence manager 60 on the Internet. In other words, firstly, BS10 accesses database 50 and provide its location information, etc. to database 50. Then, BS10 can get the list of frequencies available for transmission and the allowable maximum transmission power, corresponding to each of the available frequencies in its setting location. Next, BS10 notifies coexistence manager 60 about the information of its setting location, the list of frequencies available for transmission and the allowable maximum transmission powers. Based on the list of frequencies available for transmission of BS10 and the operative channel information of another second use system existing around BS10, coexistence manager 60 can restructure the list of frequencies available for transmission of BS10. Thereafter, coexistence manager 60 may respond to BS10 by the list of frequencies available for transmission, including restructured information. BS10 selects an operative channel among the list of frequencies available for transmission, including restructured information. Then, BS10 notifies coexistence manager 60 of the operative channel of BS10. In this way, coexistence manager 60 can know the frequency used by BS10 as the secondary use.

On the other hand, just after the initialization (before the establishment of radio communication link with CPE21), BS20 is not connected to Internet 40. Therefore, as a frequency to use for wireless communication, BS20 transmits or receives the radio wave using frequency f10, which is estimated so that BS20 can use the frequency for transmitting or receiving. After completing the network entry under establishing a wireless link with CPE21, BS20 accesses database 50 on Internet 40, via CPE21, CPE11 and BS10. BS20 transmits at least its location information to database 50. Thereafter, corresponding to the location of BS20, BS20 gets the list of frequencies available for transmission and the allowable maximum transmission power corresponding to each frequency. Next, BS20 notifies coexistence manager 60 about the information of its location, the list of frequencies available for transmission and the allowable maximum transmission powers. Based on the list of frequencies available for transmission of BS20, and if necessary, based on the operative channel information of another second use system existing around BS20, coexistence manager 60 can restructure the list of frequencies available for transmission of BS20. Thereafter, coexistence manager 60 may respond to BS20 by the list of frequencies available for transmission, including restructured information. BS20 selects an operative channel from among the list of frequencies available for transmission, including restructured information. Then, BS20 notifies coexistence manager 60 of its own operative channel. In this way, coexistence manager 60 can know the frequency used by BS20 as the secondary use.

In this embodiment, frequency f10, which is used to get the list of frequencies available for transmission based on the location information of BS20, is estimated so that BS20 does not give a primary user interference. In order that BS or CPE can use such a frequency, for example, the frequency which is estimated so as to transmit within the area specified by the location information, may be predetermined from among the available frequencies of the UHF zone. By having the information of the estimated frequency as one of the initial information, BS can select the frequency for the communication. In addition, in CPE, by having the information of the estimated frequency as one of the initial information, CPE can search BS by using the frequency in the state after a start of supply of the electricity.

In another embodiment, it may be possible that BS20 is allocated as a primary user of frequency f10.

[Configuration of BS10 or BS20]

Figure 2:
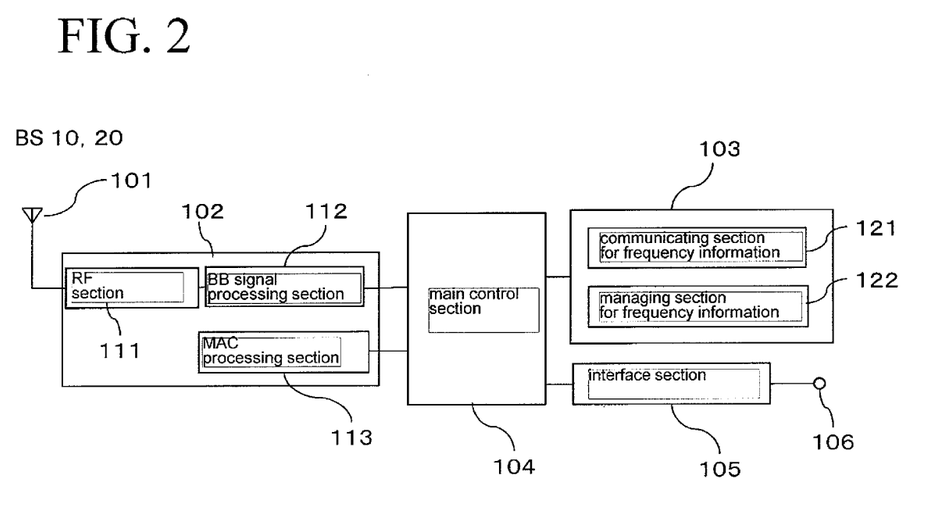
FIG. 2 Figure depicting the example of concrete configuration of BS.

We will explain each configuration of BS10 and BS20 more concretely, by referring to FIG. 2 as follows. As illustrated in FIG. 2, each of BS10 and BS20 may include antenna 101 for transmitting/receiving radio waves, data communication section 102 for transmitting/receiving data, Spectrum Manager (SM) 103 for managing the operational channel or the frequencies which are available for transmission, main control section 104 for controlling the base station, interface section 105 for interfacing with backhaul line 30 or an external device, and terminal 106 for connecting to backhaul line 30 or the external device.

Data communication section 102 may include RF section 111, baseband (BB) signal processing section 112 and MAC processing section 113. RF section 111 may convert a baseband to a radio frequency band, convert the radio frequency band to the baseband, and amplify signals etc. Baseband (BB) signal processing section 112 may perform an error correction coding/decoding and modulation/demodulation processing etc. MAC processing section 113 may perform a control for the operational channel, the data transmission/reception timings, an addition of its station identifier to a communication packet, and a recognition of the wireless equipment which transmitted data etc.

Spectrum Manager (SM) 103 may include a communicating section for frequency information 121 and managing section for frequency information 122. Communicating section for frequency information 121 may transmit its location information etc. to database 50. Thereby, communicating section for frequency information 121 can get the list of frequencies which are available for transmission in its setting location and the allowable maximum transmission powers, corresponding to each frequency. Next, communicating section for frequency information 121 may notify coexistence manager 60 about the information of its setting location, the list of frequencies available for transmission and the allowable maximum transmission powers. Thereby, communicating section for frequency information 121 can get the list of frequencies which are available for transmission, reconstructed by coexistence manager 60.

In the situation that its own station is connected to Internet 40 via interface section 105, in other words, in the situation that its own station can access database 50 or coexistence manager 60, the station may select an operational channel from among the list of frequencies available for transmission, received from coexistence manager 60. Then, the operational channel may be set to data transmission section 102. Then, the station may notify coexistence manager 60 about its operational channel. In the situation that its own station is not connected to Internet 40 via interface section 105, in other words, in the situation that its own station cannot access database 50 or coexistence manager 60, the station may read frequency f10 from its internal memory etc., frequency f10, being guaranteed that there is no primary user using this frequency. Then frequency f10 may be set to data transmission section 102 as the operational frequency of its own cell.

For example, main control section 104 can be configured by a processor, a data storage area defined on memory, and software. Each procedure in BB signal processing section 112, MAC processing section 113 and Spectrum Manager (SM) 103 may be executed by the processor in main control section 104. The programs for the processor were loaded from the data storage memory like a hard disk device or flash memories etc. to the internal memory in main control section 104.

[Configuration of CPE11, CPE21 or CPE22]

Figure 3:
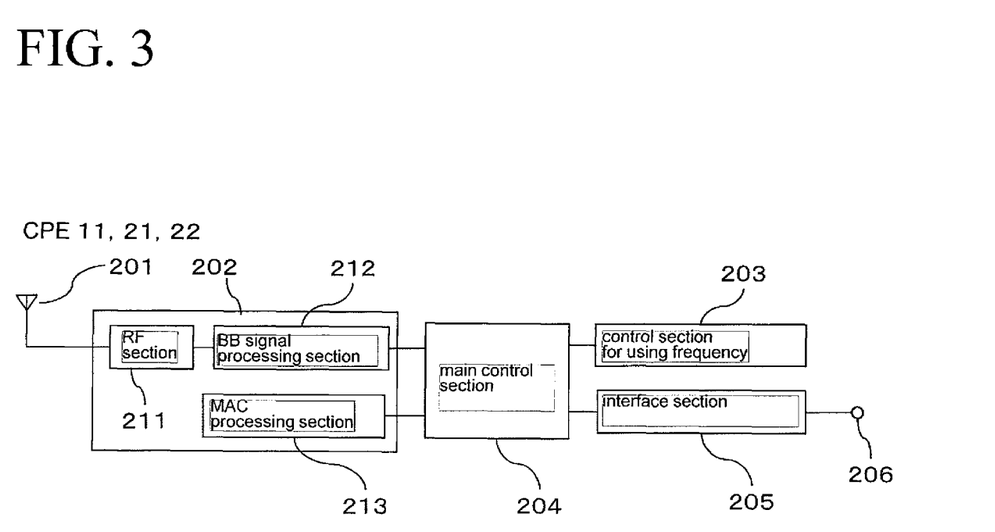
FIG. 3 Figure depicting the example of concrete configuration of CPE.

We will explain each configuration of CPE11, CPE21 and CPE22 more concretely, by referring to FIG. 3 as follows. As illustrated in FIG. 3, each of CPE11, CPE21 and CPE22 may include antenna 201 for transmitting/receiving radio waves, data communication section 202 for transmitting/receiving data, control section for using frequency 203 for controlling own operational channel, main control section 204 for controlling its own station, interface section 205 for interfacing with an external line or an external device, and terminal 206 for connecting to the external line or the external device.

Data communication section 202 may include RF section 211, baseband (BB) signal processing section 212 and MAC processing section 213. RF section 211 may convert a baseband to a radio frequency band, convert the radio frequency band to the baseband, and amplify signals etc. Baseband (BB) signal processing section 212 may perform an error correction coding/decoding and modulation/demodulation processing etc. MAC processing section 213 may perform a control for the operational channel, the data transmission/reception timings, an addition of its station identifier to a communication packet, and a recognition of the wireless equipment which transmitted data etc.

In the situation that its own station is connected to Internet 40 via interface section 205, in other words, in the situation that its own station can access database 50 or coexistence manager 60, the station may read frequency f10 from a memory etc., frequency f10, being guaranteed that there is no primary user using this frequency. Then the station may search BS using frequency f10. On the other hand, in the situation that its own station is not connected to Internet 40 via interface section 205, in other words, in the situation that the station cannot access database 50 or coexistence manager 60, the station may search BS without making a limit for frequency to use for a search.

In addition, main control section 204 can be configured by a processor, a data storage area defined on memory and software. Each procedure in BB signal processing section 212 and MAC processing section 213 may be executed by the processor in main control section 204. The programs for the processor were loaded from the data storage memory like a hard disk device etc. to its memory.

[Example of the Changing Pattern of the Frequency to Use for Wireless Communication]

We will explain the examples of the changing patterns of the frequencies to use for wireless communication in each of BS10, BS20, CPE11, CPE21 and CPE22, by referring to FIG. 4, FIG. 5 or FIG. 6 as follows.

Figure 4:
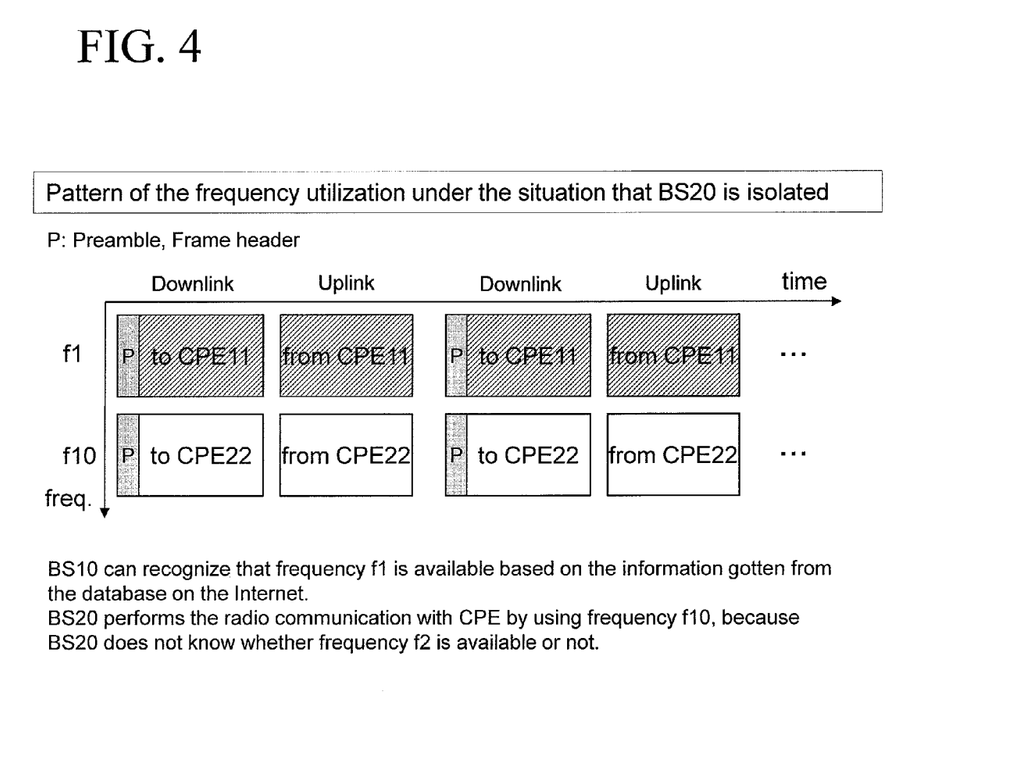
FIG. 4 Figure depicting the example of frequency utilization under the situation that BS20 is isolated.

FIG. 4 depicts the example of frequency utilization under the situation that BS20 is isolated. Each of BS10 and CPE11 has gotten the list of frequencies available for transmission, based on its location information, respectively. Then, each station is performing the radio communication using operational frequency f1, being included in the list of frequencies available for transmission. On the other hand, until BS20 establishes radio communication link with CPE21, BS20 is isolated and not connected to Internet 40. Therefore, BS20 cannot get the list of frequencies available for transmission, based on its location information. Then, BS20 is performing a radio communication using frequency f10, guaranteed not to give a primary user interference. As CPE22 had not connected to Internet 40 via interface section 205, CPE22 had been searching BS without making a limit for frequencies to use for a search. Thereafter, CPE22 received the radio wave transmitted from BS20 under using frequency f10, CPE22 has been connecting with BS20 under using frequency f10.

Figure 5:
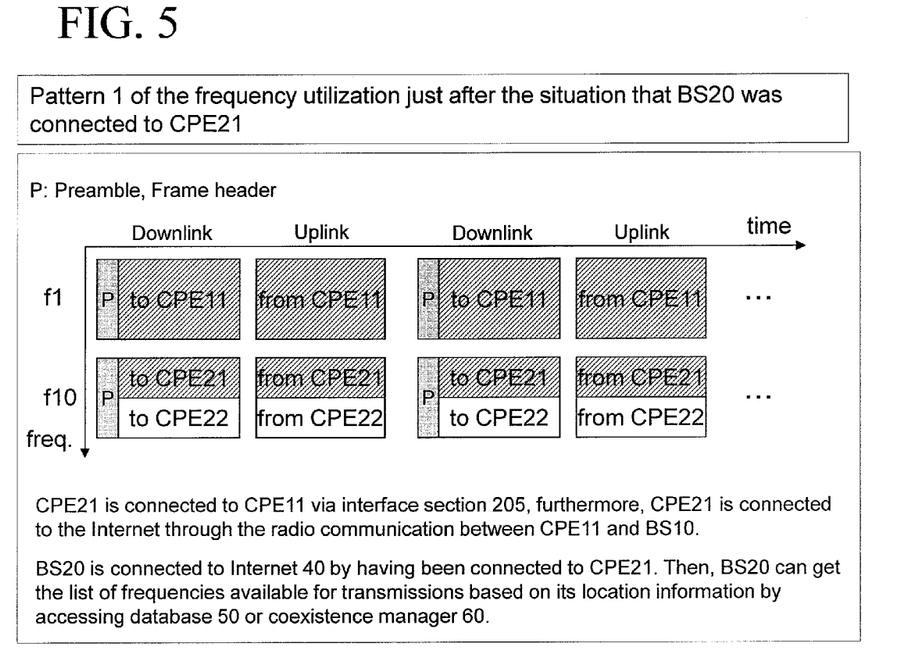
FIG. 5 Figure depicting the example of frequency utilization just after that CPE21 was connected to BS20 by wireless communication.
Figure 6:
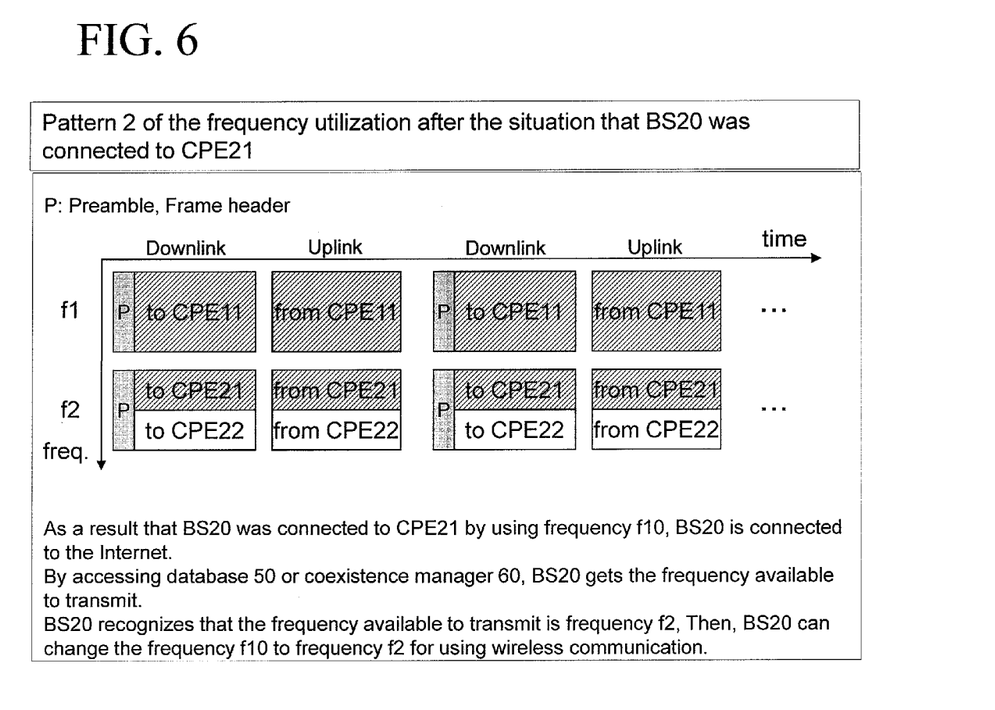
FIG. 6 Figure depicting the example of frequency utilization under the situation that BS22 is connected to the Internet via CPE21.

FIG. 5 depicts the example of frequency utilization just after the situation that CPE21 was connected to BS20 by wireless communication. CPE21 is connected to CPE11 via interface section 205. Furthermore, CPE21 is connected to Internet 40 through the radio communication between CPE11 and BS10. In this situation, CPE21 may be connected to BS20 by searching BS using frequency f10, guaranteed not to give a primary user interference. As a result, BS20 is connected to Internet 40 by having been connected to CPE21. Then, BS20 can get the list of frequencies available for transmission based on its location information by accessing database 50 or coexistence manager 60.

As a result that BS20 was connected to CPE21, BS20 is able to get the list of frequencies available for transmission based on its location information, from database 50, etc. on Internet 40. FIG. 6 depicts the example of frequency utilization after the situation that BS20 can get the list of frequencies available for transmission based on its location. In this situation, BS20 can select frequency f2 from among the list of frequencies available for transmission, based on its location information. Then, BS20 can change the frequency f10 to frequency f2 for wireless communication. In response to this frequency changing procedure in BS20, each frequency for wireless communication, used in CPE21 and CPE22 is changed from frequency f10 to frequency f2, respectively.

[Conclusion]

As stated above, according to this embodiment, following wireless communication system using white spaces is disclosed. In the situation that a base station which needs to perform a radio communication with a terminal station before retrieving a list of frequencies available for transmission from database etc., the base station can get the list of frequencies available for transmission by the radio communication using the frequency which is guaranteed to be able to transmit. Therefore, the base station can perform the radio communication using a white space, without emitting the radio waves whose frequencies may not be allowed to use for transmitting.

In addition, this embodiment can apply to the base station desiring to use white spaces as frequency resources, except predetermined available frequencies. In this case, the base station can also perform the radio communication using white spaces, without emitting the radio waves whose frequencies may not be allowed to use for transmitting. Here, example for the cases that uses white spaces as frequency resources, except predetermined available frequencies are as follows:

to use white spaces for off-road communication, under a situation that available frequencies are in a busy condition, to use white spaces as additional frequencies, under a shortage of available frequencies for configuring a relay system, and to use white spaces as data communication frequencies, under a situation that the band of the available frequency is narrowband, and cannot use the band for broadband data communications.

In addition, this invention is particularly suitable for a wireless communication system, prescribed in IEEE802.22, but not limited to such a system. The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

DESCRIPTION OF THE PREFERRED EMBODIMENT(S)

This invention can apply to the various kind of wireless communication system, which is using a white space.

REFERENCE SIGNS LIST

1: wireless communication system
2: existing system
10: base station (BS)
11,21,22: Customer Premises Equipment (CPE)
30: backhaul line
40: Internet
50: database (DB)
60: coexistence manager (CM)
70: transmitting station
80: receiving station
101: antenna
102: data transmission section
103: Spectrum Manager (SM)
104: main control section
105: interface section
106: terminal
111: RF section
112: BB signal processing section
113: MAC processing section
121: communicating section for frequency information
122: managing section for frequency information
201: antenna
202: data transmission section
203: control section for using frequency
204: main control section
205: interface section
206: terminal
211: RF section
212: BB signal processing section
213: MAC processing part

What is claimed is:

1. A wireless communication system configured to perform a relay operation by using white spaces in a wireless access system, the wireless communication system comprising:

a first base station accessing a management apparatus managing information of a white space, without accessing wireless communication with a terminal station within a cell of the first base station;

a second base station accessing the management apparatus, by accessing the wireless communication with the terminal station within the cell of the second base station; and a relay station that relays communication between the first base station and the second base station, wherein the first base station and the second base station operate under a synchronized frame timing using a same TDD wireless access system, wherein the relay station is configured to connect a first terminal station within the cell of the first base station, and a second terminal station within the cell of the second base station, by a wire line, wherein the second base station, in order to acquire the information of the white space that is available in the second base station, communicates with the second terminal station by using the predetermined frequency, and wherein the second base station, after acquiring the information of the white space that is available in the second base station, performs radio communications with the second terminal station and another terminal station within the cell of the second base station by using the white space.

2. A wireless communication system to conduct communications between a base station and a terminal station using a white space secondarily, wherein the white space is a frequency that is not used by a primary user among the frequencies licensed to the primary user, the wireless communication system comprising:

a managing apparatus that manages information of white spaces, wherein the base station having information of a predetermined frequency estimated so that the base station does not cause interference with a wireless communication of a primary user, wherein the base station, in order to acquire information of the white space that is available in the base station, communicates with the terminal station within a coverage area of the base station, by using the predetermined frequency, wherein the base station accesses the managing apparatus via the wireless communication using the predetermined frequency, wherein the base station, after acquiring the information of the white space that is available in the base station, performs radio communication with the terminal station within a cell of the base station, by using the white space, wherein the terminal station has information of the predetermined frequency estimated so that the base station does not cause interference with the wireless communication of the primary users, or the terminal station acquires the information from the manacling apparatus, wherein the terminal station seeks the base station by using the predetermined frequency while the terminal station is not connected to the base station by the wireless communication, wherein, thereafter, the terminal station gives priority to connect to the base station detected by using the predetermined frequency, wherein in response to the terminal station being able to access the managing apparatus or Internet, the terminal station seeks the base station by using the predetermined frequency, wherein in response to the terminal station not being able to access the managing apparatus or the Internet, the terminal station seeks the base station without making a limit for frequencies, wherein the terminal station, located within a cell of the second base station configured as the relay station, has information of the predetermined frequency, or acquires the information from the managing apparatus, wherein the frequency is guaranteed that the second base station having the terminal station within a cell of the second base station does not cause interference with the wireless communication of the primary users, wherein the terminal station searches the base station under the predetermined frequency for a state that the terminal station is not connected to the second base station, and wherein the terminal station gives priority to connect to the base station detected by using the predetermined frequency.

* * * * *